US012691511B2

(12) United States Patent
Holt et al.

(10) Patent No.: US 12,691,511 B2
(45) Date of Patent: Jul. 28, 2026

(54) CHOP SAW

(71) Applicant: Evolution Power Tools Limited,
Sheffield (GB)

(72) Inventors: Will Holt, Sheffield (GB); Simon Donson, Sheffield (GB); Steven Lee Price, Sheffield (GB)

(73) Assignee: Evolution Power Tools Limited,
Sheffield (GB)

( * ) Notice: Subject to any disclaimer, the term of this patent is extended or adjusted under 35 U.S.C. 154(b) by 219 days.

(21) Appl. No.: 18/209,249

(22) Filed: Jun. 13, 2023

(65) Prior Publication Data

US 2023/0405694 A1      Dec. 21, 2023

(30) Foreign Application Priority Data

Jun. 17, 2022    (GB) ..................................... 2208986

(51) Int. Cl.
B23D 45/02            (2006.01)
B23D 45/04            (2006.01)
B27B 27/04            (2006.01)

(52) U.S. Cl.
CPC ......... B23D 45/024 (2013.01); B23D 45/028 (2013.01); B23D 45/044 (2013.01); B27B 27/04 (2013.01)

(58) Field of Classification Search
CPC .. B23D 45/024; B23D 45/028; B23D 45/044; B23D 47/02; B23D 45/048; B23D 47/025; B23D 47/126; B23D 61/10; B27B 27/04; B27B 5/29; B27B 27/06; B27B 5/208; Y10T 83/7793; Y10T 83/7705

USPC ...... 83/471.2, 473, 491, 397, 478, 490, 483, 83/485, 486, 486.1, 487, 488, 489; 29/426.2
See application file for complete search history.

(56) References Cited

U.S. PATENT DOCUMENTS

| | | | | |
|---|---|---|---|---|
| 5,241,888 A | * | 9/1993 | Chen ....................... | F16C 29/00 83/486.1 |
| 5,524,516 A | * | 6/1996 | Sasaki .................. | B23D 45/048 83/477.1 |
| 6,997,091 B1 | * | 2/2006 | Shibata ................ | B23D 45/048 83/485 |

(Continued)

FOREIGN PATENT DOCUMENTS

| | | | | |
|---|---|---|---|---|
| RU | 2308359 C2 | * | 10/2007 | ........... B23D 45/048 |
| WO | 2015005087 A1 | | 1/2015 | |

*Primary Examiner* — Ghassem Alie
(74) *Attorney, Agent, or Firm* — IPro, PLLC

(57) ABSTRACT

A chop saw power tool for cutting metal is described. The chop saw power tool has a saw base and a cutting head assembly. The saw base has: a support structure and a workpiece support table having a workpiece support surface to receive a workpiece. The workpiece support table is rotatable in a plane of the workpiece support surface relative to the support structure to select an angle of cut of the workpiece. The cutting head assembly has: a circular cutting blade on the cutting head assembly and an axis of rotation such that the circular cutting blade rotates within a cutting plane arranged in a fixed orientation perpendicular to the plane of the workpiece support surface. The cutting head assembly is pivotable relative to the saw base in a direction parallel to the cutting plane. The cutting head assembly is linearly moveable relative to the workpiece support table.

21 Claims, 4 Drawing Sheets

(56)                    References Cited

U.S. PATENT DOCUMENTS

| 8,418,590 B2 * | 4/2013 | Agan | B27B 27/04 |
| | | | 83/581 |
| 9,339,877 B2 * | 5/2016 | Lin | B23D 47/02 |
| 2003/0226436 A1 * | 12/2003 | Higuchi | B23D 45/048 |
| | | | 83/581 |
| 2006/0042442 A1 * | 3/2006 | Ushiwata | B27B 5/29 |
| | | | 83/167 |
| 2007/0074611 A1 * | 4/2007 | Hu | B27B 5/29 |
| | | | 83/485 |
| 2012/0031248 A1 * | 2/2012 | Park | B27B 5/29 |
| | | | 83/471.2 |
| 2019/0291193 A1 * | 9/2019 | Chang | B27B 5/32 |

* cited by examiner

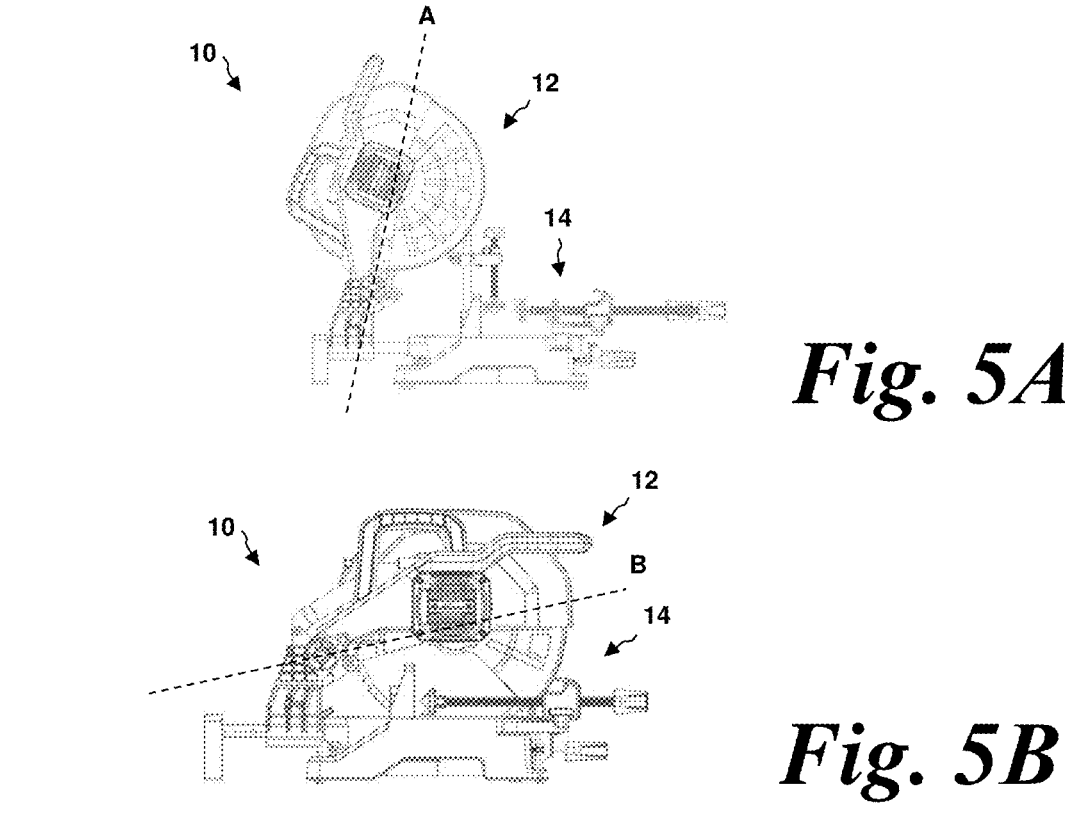
*Fig. 5A*
*Fig. 5B*
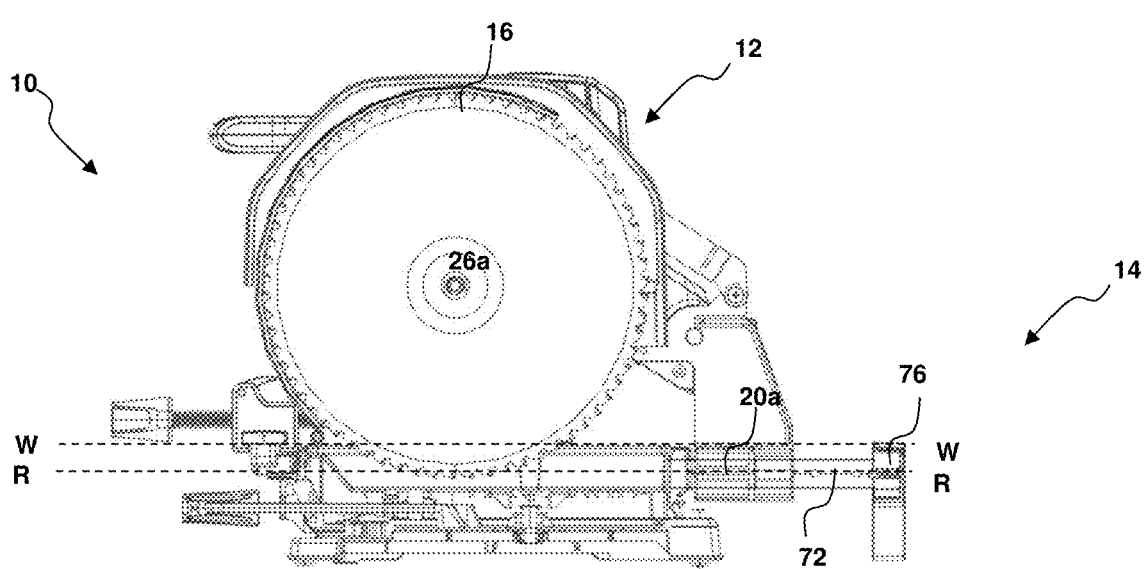
*Fig. 6*

CHOP SAW

TECHNICAL FIELD

The present disclosure relates to a circular cutter saw in the form of a chop saw power tool. More particularly, the present disclosure relates to a circular cutter saw in the form of a chop saw power tool operable to perform mitre cuts.

BACKGROUND

Chop saws are relatively heavy-duty power tools which comprise an abrasive or toothed circular blade and which are primarily adapted to metal. Such saws are commonly used in the construction and building industry, and in domestic environments, to make simple vertical cuts with a substantially vertically arranged circular blade rotating about a generally horizontal axis and which is pivoted on a fixed horizontal axis.

A typical workpiece to be cut with a chop saw may be a hollow metal bar having a square cross section. In use, a user places the workpiece on a workpiece support surface such that the workpiece abuts a vertical support fence. The support fence and workpiece is then translated horizontally to position the workpiece in the optimal position for cutting, and the workpiece clamped in place.

It is usual to place a workpiece such as a square metal bar lengthwise across the workpiece support surface with the cross section of the bar angled at substantially 45 degrees such that a corner of the bar projects vertically. This is to ensure that the blade cuts through a substantially constant cross section of material throughout the cut. If the bar is orientated such that the blade encounters a flat surface, then the cross section through which the blade cuts varies considerably, leading to vibration, instability, a poor cut and potential damage.

SUMMARY

Given the forces involved in cutting metal workpieces, accurate placement of the workpiece on the support surface is critical to ensure smooth and accurate chop saw operation. Considering a square metal bar positioned at 45 degrees as discussed above, the optimal position is one such that there is a parity of angle between a) the portion of the blade to make the first contact with the workpiece and the downwardly sloping front surface of the workpiece, and b) between the blade and the downwardly sloping rear surface of the workpiece. When so positioned, the blade is then pivoted downwardly to make contact with, and cut through, the metal workpiece. Given the forces and potential vibration involved in cutting a material such as metal, a chop saw is required to be highly structurally rigid.

In general, chop saws are designed to cut a workpiece along a single plane perpendicular to the support fence direction. However, an alternative class of saw, a mitre saw, is capable of making efficient angled cuts of softer materials such as wood. A mitre saw has a rotatable support surface such that angled cuts can be made.

In general, the design and configuration of a mitre saw is not suitable for heavy-duty applications such as cutting metal. It is also not possible to set the optimal cutting angle on a mitre saw, given this is usually not required for cutting softer materials such as wood.

Indeed, the cut angle is often very different on a mitre saw. For example, a sliding mitre saw (SMS) in general has a cutting head and blade mounted on high-set rails. During a cut, the cutting head is both pivoted and translated to draw the blade through the workpiece. Whilst this can allow wider workpieces to be cut, such saws are unsuitable for heavier-duty material such as metal.

According to a first aspect of the present disclosure, there is provided a chop saw power tool for cutting metal, the chop saw power tool comprising a saw base and a cutting head assembly, the saw base comprising: a support structure; and a workpiece support table comprising a workpiece support surface arranged to receive a workpiece to be cut in a cutting operation, the workpiece support table being rotatable in a plane of the workpiece support surface through a predetermined angular range relative to the support structure to select an angle of cut of the workpiece, the cutting head assembly comprising: a circular cutting blade arranged on the cutting head assembly and having an axis of rotation such that the circular cutting blade rotates within a cutting plane arranged in a fixed orientation perpendicular to the plane of the workpiece support surface, wherein the cutting head assembly is pivotable relative to the saw base in a direction parallel to the cutting plane between a position where the cutting blade is remote from the workpiece and a position where the cutting blade is in contact with the workpiece, wherein the cutting head assembly is linearly moveable relative to the workpiece support table to adjust a cut position of the cutting blade on a workpiece; and wherein the chop saw power tool further comprises an interlock arranged to secure the cutting head assembly in one or more fixed positions relative to the workpiece support table prior to a cutting operation.

In one embodiment, the cutting head is linearly movable along an axis parallel to the plane of the workpiece support surface.

In one embodiment, the interlock is arranged to secure the cutting head assembly in a plurality of discrete spaced fixed linear positions relative to the workpiece support table prior to a cutting operation.

In one embodiment, the interlock comprises a first interlocking element fixed relative to one of the cutting head assembly and the workpiece support table and a second interlocking element fixed relative to the other of the cutting head assembly and the workpiece support table.

In one embodiment, a plurality of second interlocking elements are provided, each second interlocking element corresponding to a discrete fixed position.

In one embodiment, the first interlocking element comprises a rod and the second interlocking element comprises an aperture dimensioned and arranged to receive the rod.

In one embodiment, the rod comprises a tapered distal end.

In one embodiment, the rod is resiliently biased in a direction perpendicular to the direction of linear movement of the cutting head assembly order facilitate engagement with the aperture.

In one embodiment, the rod comprises a coil spring arranged to surround the rod.

In one embodiment, the rod further comprises a graspable handle arranged to move in a direction perpendicular to the direction of linear movement of the cutting head assembly order facilitate engagement with the aperture.

In one embodiment, the chop saw power tool further comprises a rail arrangement to enable linear movement of the cutting head assembly relative to the workpiece support table.

In one embodiment, the rail arrangement is fixedly connected to the workpiece support table and the cutting head assembly is arranged to be movable linearly on the rail arrangement.

In one embodiment, the rail arrangement is fixedly connected to the cutting head assembly and the cutting head assembly and rail arrangement are arranged to be movable linearly with respect to the workpiece support table.

In one embodiment, the interlock is arranged to interengage with at least a part of the rail arrangement to secure the cutting head assembly in said one or more fixed linear positions relative to the workpiece support table prior to a cutting operation.

In one embodiment, the rail arrangement is arranged below the plane of the workpiece support surface.

In one embodiment, the cutting head assembly comprises a cutting head base arranged in a fixed rotational orientation relative to the saw base and a pivot connection to enable the remainder of the cutting head assembly to pivot with respect to the cutting head base, the pivot connection being offset from the cutting plane.

In one embodiment, the chop saw power tool further comprises engagement means operable to selectively provide a friction engagement of the cutting head assembly relative to the workpiece support table to assist in securing the cutting head assembly in one or more fixed linear positions prior to a cutting operation.

In one embodiment, the chop saw power tool further comprises a fence arranged to enable positioning and location of a workpiece, the fence being arranged in a fixed orientation with respect to the support structure of the saw base.

In one embodiment, the fence extends across the workpiece support surface and comprises a gap located and arranged in the cutting plane of the cutting blade such that the cutting blade can pass therethrough during a cut.

According to a second aspect of the present disclosure, there is provided a method of using the chop saw power tool of any one of the preceding claims, the method comprising the steps of: a) positioning a workpiece on the workpiece support surface and securing the workpiece; b) linearly adjusting the cutting head assembly relative to the workpiece support table to adjust a cut position of the cutting blade on a workpiece; c) securing, using the interlock, the cutting head assembly in a fixed position relative to the workpiece support table; and e) performing a cutting operation.

In one embodiment, the method further comprises, prior to step d): e) adjusting the mitre angle of the cutting head and workpiece support surface relative to the workpiece to select a desired angle of cut.

BRIEF DESCRIPTION OF FIGURES

FIGS. 5A and 5B show side views of the chop saw power tool of FIG. 1 with the cutting head in different positions;

FIG. 6 shows a side section view of the chop saw power tool of FIG. 1 taken along the axis C-C as shown in FIG. 3;

DETAILED DESCRIPTION

The general configuration of a power tool in the form of a metal-cutting chop saw according to an embodiment of the present disclosure will be described with reference to FIGS. 1 to 8.

Figures 1, 2:
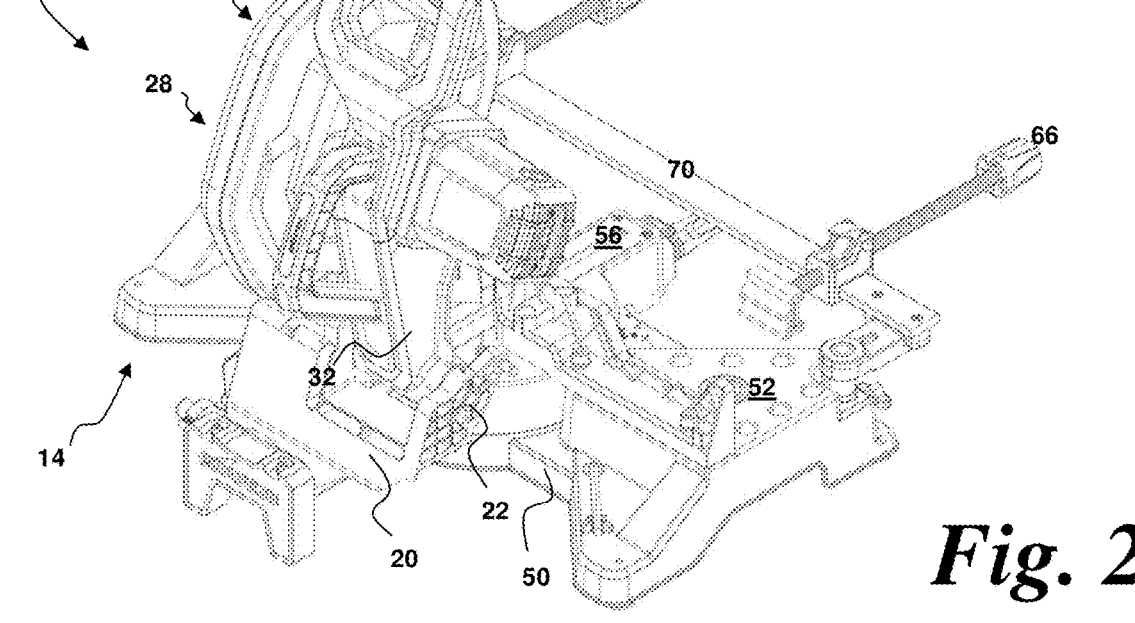
FIG. 1 shows a front perspective view of a chop saw power tool according to an embodiment.
FIG. 2 shows a rear perspective view of the chop saw power tool of FIG. 1.
Figures 3, 4:
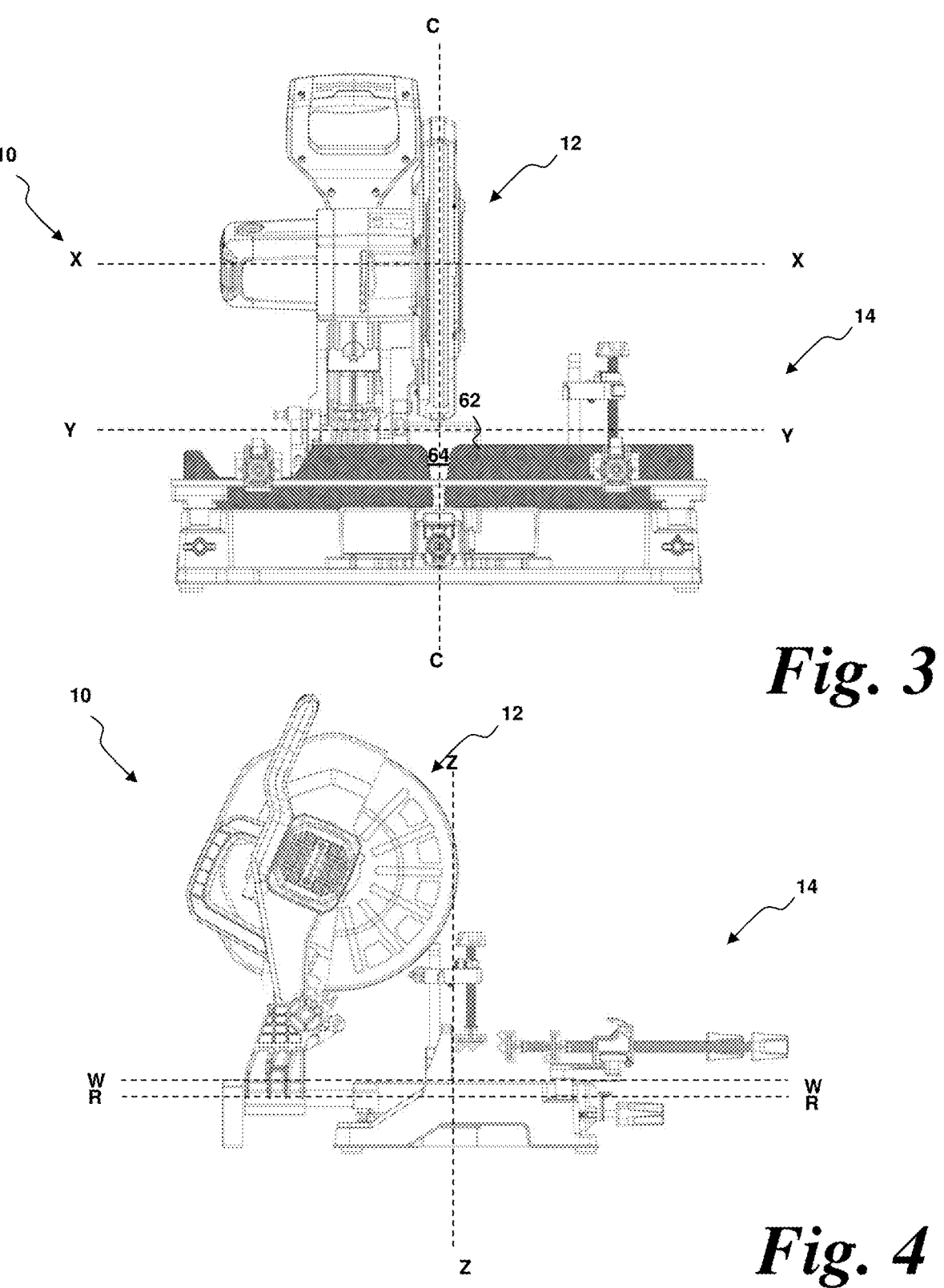
FIG. 3 shows a front view of the chop saw power tool of FIG. 1.
FIG. 4 shows a side view of the chop saw power tool of FIG. 1.

FIGS. 1 to 8 show a chop saw 10 according to an embodiment of the present disclosure. FIG. 1 shows a front perspective view and FIG. 2 a rear perspective view. FIG. 3 shows a front view and FIG. 4 shows a side view of the chop saw 10.

The chop saw 10 comprises a cutting head assembly 12 and a saw base 14.

The cutting head assembly 12 comprises a circular cutting blade 16 (best shown in FIG. 6). In embodiments, the cutting blade 16 is rotatable about an axis of rotation X-X (FIG. 3). The blade 16 is configured to cut metal and has a toothed cutting surface. However, this is not limiting and other types of circular blade, for example a circular blade with a continuous edge such as an abrasive disc, may be used. The skilled person would readily appreciate the types of blade which could be used with the chop saw 10 of the present disclosure in order to cut metal.

The cutting head assembly 12 comprises a cutting head 18 and a cutting head base 20 which is connected to the cutting head 18 via a pivot connection 22. The pivot connection 22 is arranged such that the cutting head assembly is pivotable about an axis Y-Y (FIG. 3) parallel to the axis X-X of the blade 16 such that the cutting head assembly 12 is pivotable in a substantially vertical plane parallel to the plane of the cutting blade 16. The cutting head assembly 12 is pivotable between an uppermost position and a lowermost cutting position. This will be described below.

The pivot connection 22 is horizontally offset from the cutting plane C-C of the cutting blade 16 (best shown in FIG. 3). The horizontally offset position of the pivot connection 22 provides more space to enable the pivot connection to be larger and stronger such that it is robust and resilient to the vibration and shock experienced in use. In addition, the offset location enables the pivot axis Y-Y to be closer to the axis X-X of the blade 16 and to be lower and closer to an axis W-W of the workpiece support surface (discussed below) than existing arrangements. This enables the chop saw 10 to be more compact and enables more accurate placement of the blade 16 when contacting the workpiece to cut the workpiece.

The pivot connection 22 further comprises a resilient means in the form of a spring 24. The spring 24 is operable to apply a restoring force to at least partially counteract the weight of the cutting head assembly 12 such that the cutting head assembly 12 can be positioned in one or more desired vertical positions without the user needing to support the weight thereof.

The cutting head assembly 12 further comprises a blade assembly 26 comprising a rotatable shaft 26*a* (FIG. 6) operable to rotate the cutting blade 16 about the axis X-X in use and a guard assembly 28. The guard assembly 28 comprises a fixed guard housing 28*a* and a rotatable guard housing 28*b*. The rotatable guard housing 28*b* is arranged to rotate manually and/or in response to pivoting of the cutting head assembly 12 such that when the cutting head assembly 12 is in the uppermost position (see FIG. 5A as described later), the blade 16 is shielded from a user, with the blade being gradually exposed to cut the workpiece when brought down into a lower position. This can be seen from a comparison with FIG. 5B.

The cutting head assembly 12 further comprises a motor housing 30 comprising a motor (not shown) to power the cutting blade via the rotatable shaft 26a. In embodiments, the motor is an AC electric motor. However, other power sources (for example, battery power) may also be used.

A pivot arm 32 extends between the motor housing and the pivot connection 22 provides a support structure for the blade assembly 26 and motor housing 30.

A handgrip assembly 34 is also provided. The handgrip assembly 34 comprises a first, carry handle 36 arranged forwardly the pivot arm 32 and configured to facilitate lifting and carrying of the chop saw 10. The carry handle 36 is looped and has a U-shaped form.

The handgrip assembly 34 further comprises a second, graspable handle 38 which forms an extension of the pivot arm 32 extending above the motor housing 30. The graspable handle 38 comprises a S-bend which extends towards a graspable section 38a which extends substantially perpendicular to the plane. A trigger 40 is located on an inner wall of the graspable section 38a and the graspable section 38a is shaped and contoured to enable a user to grasp the handle 38 with one hand and activate the trigger 40 with the user's fingers.

The saw base 14 comprises a lower portion 50 extending substantially width-wise across the chop saw 10 and comprising a pair of outer support structures 52 arranged either side of a workpiece support table 54. The outer support structures 52 have a general triangular shape and comprise a plurality of feet to support the chop saw 10 on a substantially horizontal surface such as a table or floor.

The workpiece support table 54 is substantially cylindrical and is rotatably supported on the lower portion 50. The support table 54 has a blade groove 56 formed centrally therein. In use, the cutting blade 16 is brought down towards the workpiece support table 52 and as the workpiece is cut, the blade 16 extends into the blade groove 56.

The workpiece support table 54 has a workpiece support surface 54a lying in a plane W-W (FIGS. 4 and 6) and is rotatable about a substantially vertical axis Z-Z (FIG. 4) relative to the lower portion 50 and outer support structures 52. The workpiece support table 54 may be rotatable by a predetermined amount either side of the central position shown in the figures. The predetermined amount may take any suitable value, for example, 45 degrees.

A handle 58 is provided at one end of the workpiece support table 54 to facilitate movement of the table around the axis Z-Z. The handle 58 may be rotated to secure the workpiece support table 54 in a desired orientation. A scale 60 is provided to indicate the angle of the workpiece support table 54 relative to the lower portion 50 and outer support structures 52.

An elongate fence 62 is provided in two parts, one part being secured to each of the outer support structures 52. The two parts of the fence 62 are spaced apart and form a cutting gap 64. In embodiments, the fence 62 is fixed to define the width of the cutting gap 64. A part of the fence 62 extends over the workpiece support surface 54a. However, the fence 62 remains in a fixed orientation with regard to the lower portion 50 and outer support structures 52 when the workpiece support table 54 is rotated. In other words, the table 54 rotates relative to the fence 62.

The saw base 14 further comprises a plurality of horizontal clamps 66 and a vertical clamp 68. The horizontal clamps 66 are arranged on a crossbar 70. The horizontal clamps 66 can be positioned at any suitable point on the crossbar 70 to clamp the workpiece where desired. Thus, in use, the workpiece is secured to the fence 62 by means of the clamps 66, 68. The table 54 and cutting head 12 then rotate with respect to the workpiece to set the desired angle for a mitre cut.

The saw base 14 further comprises slide rails 72. The slide rails 72 are, in embodiments, fixedly connected to the workpiece support table 54 and rotate therewith relative to the lower portion 50. The slide rails 72 extend along an axis R-R (FIGS. 4 and 6), are located below a plane W-W of the workpiece support surface 54a, and extend forwardly of the remainder of the base 14 therebelow. The slide rails 72 terminate in an end block 72a which comprises a pair of legs to support the slide rails 72.

The cutting head assembly 12 is slideably mounted on the slide rails 72 such that the cutting head assembly 12 can translate linearly towards and away from the workpiece support table 54 in use along the axis R-R. The cutting head base 20 comprises a pair of cylindrical bores 20a through which the slide rails 72 extend. The axis R-R is, as shown in FIGS. 4 and 6, parallel to the plane W-W of the workpiece support surface 54a and, in embodiments, is arranged below the plane W-W.

Given the relatively high forces acting on the cutting head assembly 12 when cutting, for example, a ferrous metallic workpiece, it is necessary to ensure that the cutting head assembly 12 is fixedly secured relative to the workpiece support table 54 and workpiece prior to a cut taking place. Therefore, whilst the cutting head assembly 12 is slideable relative to the workpiece support table 54, it must be locked in place prior to a cut taking place.

Figure 7:
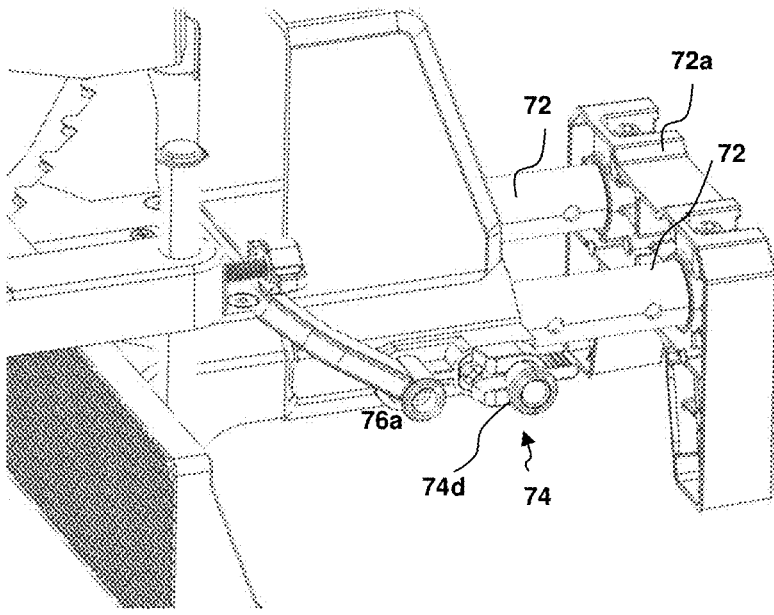
FIG. 7 is an enlarged view of the front elements of the chop saw power tool of FIG. 1.
Figure 8:
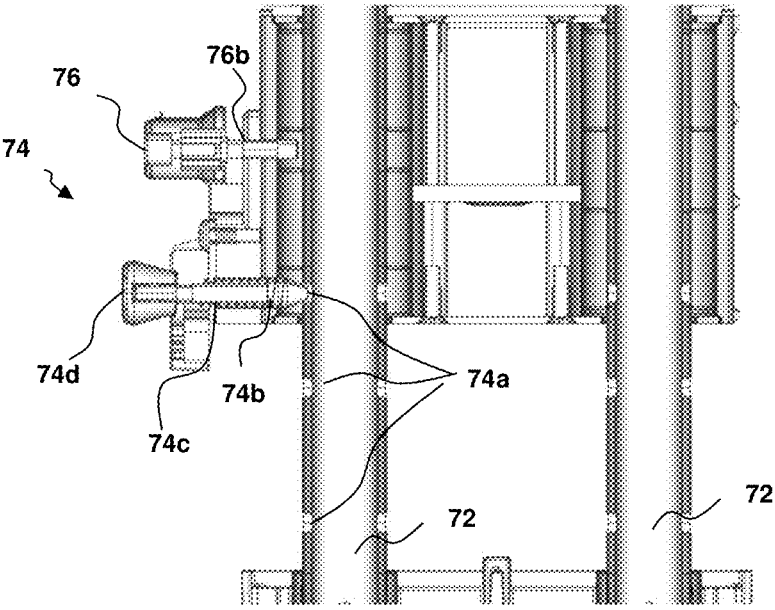
FIG. 8 is a section taken along the plane R-R (FIG. 6) showing an interlock.

In this regard, and with reference to FIGS. 7 and 8, interlock means 74 is provided. The interlock means 74 comprise first and second parts operable to engage firmly with each other to form a secure connection. By "interlock" is meant two elements which are shaped and arranged such that they engage together in such a manner that one element is received by another or one element has a complementary shape to fit with another.

For example, the interlock may include a lug received in an aperture or a key in a slot. Interlocking or inter-engaging of parts results in a robust and rigid mechanical connection between the parts in more than one dimension. "Interlock" does not imply a permanent connection and the connection may be releasable. A simple abutment of two parts, e.g. two surfaces in friction with no part being received in another or inter-engaged, is not intended to fall within this term.

In embodiments, the interlock means 74 enable the cutting head assembly 12 to be inter-engaged or interlocked with the slide rails 72 prior to a cut taking place. A conventional friction-type hold (e.g. a screwthreaded member engaging with an outer surface of a slide rail as is well known) is alone insufficient to ensure that the cutting head assembly 12 is secured safely for a cut to take place.

As shown in FIGS. 7 and 8, in one embodiment the interlock means 74 comprises a plurality of spaced apertures 74a in the slide rails 72 and a corresponding locking pin 74b located in the cutting head base 20.

The locking pin 74b is biased towards the respective slide rail 72 by means of a compression spring 74c. In this embodiment, three apertures 74a are provided setting three discrete positions of the cutting head assembly 12 relative to the workpiece support table 54 and workpiece. The positions can be selected by means of a toggle handle 74d arranged on the locking pin 74b such that the pin 74b can be drawn back, the position of the cutting head assembly 12 adjusted and then the locking pin 74b engaged with an aperture 74a such that at least a part of the pin 74b passes through the aperture 74a. As such, inter-engagement occurs between the slide rails 72 of the saw base 14 and the cutting head base 20 of the cutting head assembly 12.

Note that in FIGS. 7 and 8 for clarity the pin 74b and handle 74d are held in a retracted and unlocked position by a clip. The clip may be used to facilitate assembly of the device. In use, the clip is removed and the pin 74b is able to extend into the aperture 74a under the bias of the spring 74c.

An engagement lever 76 is also provided. The engagement lever is operable to selectively provide a friction engagement of the cutting head assembly 12 relative to the workpiece support table 54 to assist in securing the cutting head assembly 12 in one or more fixed linear positions prior to a cutting operation. In an example, the engagement lever 76 has a cam surface 76a which is operable to move a friction pin 76b towards and into friction engagement with the slide rail 72. This provides an additional means for ensuring that the cutting head 12 is secured to the saw base 14.

The present disclosure provides a chop saw operable to provide mitre functionality for a metal-cutting applications. The provision of a cutting head assembly 12 which is linearly movable with respect to the saw base 14 along an axis R-R enables a maximally-aligned cut position to be set before the workpiece is cut, ensuring safe and accurate cuts with a saw 10 sufficiently robust to handle heavy-duty applications such as cutting ferrous and non-ferrous metal.

A maximally-aligned cut position is one such that minimises the difference between the angle between a) the portion of the blade to make the first contact with the workpiece and the downwardly sloping front surface of the workpiece, and b) between the blade and the downwardly sloping rear surface of the workpiece. In a conventional chop saw this is effected by movement of the fence longitudinally. However, this cannot be achieved in known saws operable to enable mitre cuts of a workpiece.

A method of use of the chop saw 10 will now be described.

In use, the chop saw 10 is in the position shown in FIG. 5A with the cutting head assembly in the upper most position. This is shown by the line A in FIG. 5A which extends from the pivot axis Y-Y to the axis of rotation X-X of the blade 16. A workpiece (for example, a square metal bar) is positioned so as to abut the fence 62 prior to cutting. Next, the user clamps the workpiece using the horizontal and vertical clamps 66, 68. The horizontal clamps 66 can be adjusted across the width of the crossbar 70.

Then, the user selects the appropriate mitre angle for the cut to be performed. This involves rotation of the workpiece support table 54 and the cutting head 12 to the desired angle for the cut. The workpiece remains in a fixed orientation with respect to the base 14. This has numerous advantages, particularly when cutting a long length of metal because irrespective of the angle of cut of the workpiece, the workpiece remains in the same orientation as the saw base 14.

The cutting blade 16 can then be positioned. The user determines the maximally-aligned cut position for the blade against the workpiece from the available discrete linear positions of the cutting head assembly. This can then be secured in place by means of the interlock means 74.

The cut can now take place and the user can grasp the graspable handle 36, activate the trigger 40 to start the rotation of the blade 16, and pivot the blade 16 downwardly to the position shown in FIG. 5B to perform the cut. Line B shows the line between the extends from the pivot axis Y-Y to the axis of rotation X-X of the blade 16. This position is shown in FIG. 6 and shows the blade 16 extending into the Variations of the above embodiments will be apparent to the skilled person. The precise configuration of components may differ and still fall within the scope of the present disclosure.

For example, whilst the above embodiment has been described with reference to slide rails which are fixed relative to the workpiece support table and workpiece support surface, this need not be the case. For example, in an alternative, the rails may be fixed to the cutting head assembly and the rails may slide relative to the workpiece support table and workpiece support surface.

In addition, slide means other than rails may be used. For example, the cutting head assembly may be mounted on a track or other structure that effects linear movement between the cutting head assembly and the saw base.

The described interlock may take any suitable form. For example, an aperture may be provided on a part of the cutting head assembly and one or more pins or rods arranged on one or more rails.

Alternatively, different interlock may be provided such as a ratchet or other rotationally movable engagement part.

The rod or pin need not be movable perpendicular to the rail direction by a toggle handle. For example, a lever having a cam surface or other arrangement to translate rotational motion into linear motion could be used to secure the relevant parts.

Embodiments of the present disclosure have been described with particular reference to the examples illustrated. While specific examples are shown in the drawings and are herein described in detail, it should be understood, however, that the drawings and detailed description are not intended to limit the disclosure to the particular form disclosed. It will be appreciated that variations and modifications may be made to the examples described within the scope of the present disclosure.

The invention claimed is:

1. A chop saw power tool for cutting metal, the chop saw power tool comprising a saw base and a cutting head assembly, the saw base comprising:

a support structure;

a workpiece support table comprising a workpiece support surface arranged to receive a workpiece to be cut in a cutting operation; and rails connected to the workpiece support table, the workpiece support table being rotatable in a plane of the workpiece support surface through a predetermined angular range relative to the support structure to select an angle of cut of the workpiece, the cutting head assembly comprising:

a circular cutting blade arranged on the cutting head assembly and having an axis of rotation such that the circular cutting blade rotates within a cutting plane arranged in a fixed orientation perpendicular to the plane of the workpiece support surface, wherein the cutting head assembly is pivotable relative to the saw base in a direction parallel to the cutting plane between a position where the cutting blade is remote from the workpiece and a position where the cutting blade is in contact with the workpiece, wherein the cutting head assembly is slideably mounted on the rails and is linearly moveable relative to the workpiece support table to adjust a cut position of the cutting blade on a workpiece; and wherein the chop saw power tool further comprises an interlock configured to secure the cutting head assembly in a plurality of discrete linearly-spaced fixed positions on the rails, relative to the workpiece support table prior to a cutting operation;

wherein the rails are connected to an end block at one end, and fixedly connected to the workpiece support table at an opposite end.

2. A chop saw power tool according to claim 1, wherein the cutting head is linearly movable along an axis parallel to the plane of the workpiece support surface.

3. A chop saw power tool according to claim 1, wherein the interlock comprises a first interlocking element fixed relative to one of the cutting head assembly and the workpiece support table and a second interlocking element fixed relative to the other of the cutting head assembly and the workpiece support table.

4. A chop saw power tool according to claim 3, wherein a plurality of second interlocking elements are provided, each second interlocking element corresponding to a discrete fixed position.

5. A chop saw power tool according to claim 3, wherein the first interlocking element comprises a rod and the second interlocking element comprises an aperture dimensioned and arranged to receive the rod.

6. A chop saw power tool according to claim 5, wherein the rod comprises a tapered distal end.

7. A chop saw power tool according to claim 5, wherein the rod is resiliently biased in a direction perpendicular to the direction of linear movement of the cutting head assembly in order to facilitate engagement with the aperture.

8. A chop saw power tool according to claim 7, wherein the rod comprises a coil spring arranged to surround the rod.

9. A chop saw power tool according to claim 5, wherein the rod further comprises a graspable handle arranged to move in a direction perpendicular to the direction of linear movement of the cutting head assembly order facilitate engagement with the aperture.

10. A chop saw power tool according to claim 1, wherein said rails are part of a rail arrangement which enables to linear movement of the cutting head assembly relative to the workpiece support table.

11. A chop saw power tool according to claim 10, wherein the rail arrangement is fixedly connected to the workpiece support table and the cutting head assembly is arranged to be movable linearly on the rail arrangement.

12. A chop saw power tool according to claim 10, wherein the rail arrangement is fixedly connected to the cutting head assembly and the cutting head assembly and rail arrangement are arranged to be movable linearly with respect to the workpiece support table.

13. A chop saw power tool according to claim 10, wherein the interlock is arranged to inter-engage with at least a part of the rail arrangement to secure the cutting head assembly in said one or more fixed positions relative to the workpiece support table prior to a cutting operation.

14. A chop saw power tool according to claim 10, wherein the rail arrangement is arranged below the plane of the workpiece support surface.

15. A chop saw power tool according to claim 1, wherein the cutting head assembly comprises a cutting head base arranged in a fixed rotational orientation relative to the saw base and a pivot connection to enable the remainder of the cutting head assembly to pivot with respect to the cutting head base, the pivot connection being offset from the cutting plane.

16. A chop saw power tool according to claim 1, further comprising an engagement lever operable to selectively provide a friction engagement of the cutting head assembly relative to the workpiece support table to assist in securing the cutting head assembly in one or more fixed linear positions prior to a cutting operation.

17. A chop saw power tool according to claim 1, further comprising a fence arranged to enable positioning and location of a workpiece, the fence being arranged in a fixed orientation with respect to the support structure of the saw base.

18. A chop saw power tool according to claim 17, wherein the fence extends across the workpiece support surface and comprises a gap located and arranged in the cutting plane of the cutting blade such that the cutting blade can pass therethrough during a cut.

19. A method of using the chop saw power tool of claim 1, the method comprising the steps of:

a) positioning a workpiece on the workpiece support surface and securing the workpiece;

b) linearly adjusting the cutting head assembly relative to the workpiece support table to adjust a cut position of the cutting blade on a workpiece;

c) securing, using the interlock, the cutting head assembly in a fixed position relative to the workpiece support table; and d) performing a cutting operation.

20. A method according to claim 19, further comprising, prior to step d):

e) adjusting the mitre angle of the cutting head and workpiece support surface relative to the workpiece to select a desired angle of cut.

21. A chop saw power tool according to claim 1, wherein the end block is configured to support the rails.

* * * * *